(12) United States Patent
Xiang

(10) Patent No.: US 9,769,878 B2
(45) Date of Patent: Sep. 19, 2017

(54) ELECTRONIC CIGARETTE AND METHOD FOR IDENTIFYING WHETHER THERE IS A MATCH BETWEEN A BATTERY COMPONENT AND AN ATOMIZER COMPONENT THEREIN

(71) Applicant: HUIZHOU KIMREE TECHNOLOGY CO., LTD., Huizhou (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

(*) Notice: Subject to any disclaimer, the term of this patent is extended or adjusted under 35 U.S.C. 154(b) by 48 days.

(21) Appl. No.: 14/657,818

(22) Filed: Mar. 13, 2015

(65) Prior Publication Data

US 2015/0189695 A1    Jul. 2, 2015

Related U.S. Application Data

(63) Continuation of application No. PCT/CN2013/085377, filed on Oct. 17, 2013.

(51) Int. Cl.
*H05B 1/02* (2006.01)
*G06K 7/10* (2006.01)
*A24F 47/00* (2006.01)

(52) U.S. Cl.
CPC ......... *H05B 1/0252* (2013.01); *A24F 47/008* (2013.01); *G06K 7/10861* (2013.01)

(58) Field of Classification Search
None
See application file for complete search history.

(56) References Cited

U.S. PATENT DOCUMENTS 5,028,769 A * 7/1991 Claypool .............. B07C 5/3412
                                                    235/454
5,283,865 A * 2/1994 Johnson .................. G06F 3/033
                                                    434/367

(Continued)

FOREIGN PATENT DOCUMENTS

CN   202890464 U   4/2013
CN   202941411 U   5/2013
CN   203492793 U   3/2014

OTHER PUBLICATIONS

International Search Report issued by State Intellectual Property Office of the P. R. China dated Jul. 7, 2014 for Application No. PCT/CN2013/085377.

*Primary Examiner* — David Angwin
*Assistant Examiner* — Gyounghyun Bae
(74) *Attorney, Agent, or Firm* — Tim Tingkang Xia, Esq.; Locke Lord LLP

(57) ABSTRACT

An electronic cigarette and a method for identifying whether there is a match between a battery assembly and an atomizer assembly therein are provided. The electronic cigarette comprises a laser identifying assembly, a battery assembly and an atomizer assembly. The laser identifying assembly includes an information portion, a laser transceiver and a controlling module, the information portion includes a group of grooves and bulges which represent a product information, the information portion is defined on one of the battery assembly and the atomizer assembly, the laser transceiver is mounted on the other of the battery assembly and the atomizer assembly; when the atomizer assembly is jointed with the battery assembly, the laser transceiver aims at the information portion, and the information portion reflects an original laser beam sent out by the laser transceiver back, then the controlling module determines whether the atomizer assembly is matched with the battery assembly.

10 Claims, 7 Drawing Sheets

(56) References Cited

U.S. PATENT DOCUMENTS

| | | | |
|---|---|---|---|
| 9,609,893 B2* | 4/2017 | Novak, III | A24F 47/008 |
| 2002/0165638 A1* | 11/2002 | Bancroft | A47F 10/00 |
| | | | 700/213 |
| 2003/0132293 A1* | 7/2003 | Fitch | G06F 1/18 |
| | | | 235/383 |
| 2005/0172976 A1* | 8/2005 | Newman | A24F 47/008 |
| | | | 131/194 |
| 2008/0000979 A1* | 1/2008 | Poisner | G06K 19/06046 |
| | | | 235/462.01 |
| 2009/0084852 A1* | 4/2009 | Vinogradov | G06K 7/10792 |
| | | | 235/462.21 |
| 2009/0272379 A1* | 11/2009 | Thorens | A24F 47/008 |
| | | | 128/202.21 |
| 2012/0145169 A1* | 6/2012 | Wu | A24F 47/008 |
| | | | 131/273 |
| 2012/0145170 A1* | 6/2012 | O'Connell | A24B 15/24 |
| | | | 131/298 |
| 2012/0174914 A1* | 7/2012 | Pirshafiey | A61M 11/041 |
| | | | 128/200.14 |
| 2012/0260926 A1* | 10/2012 | Tu | A24F 47/008 |
| | | | 131/329 |
| 2013/0160764 A1* | 6/2013 | Liu | A61M 15/06 |
| | | | 128/202.21 |
| 2013/0192618 A1* | 8/2013 | Li | A24F 47/008 |
| | | | 131/329 |
| 2013/0228191 A1* | 9/2013 | Newton | A24F 47/008 |
| | | | 131/329 |
| 2013/0306084 A1* | 11/2013 | Flick | A24F 47/008 |
| | | | 131/328 |
| 2013/0319407 A1* | 12/2013 | Liu | A61M 15/06 |
| | | | 128/202.21 |
| 2014/0007863 A1* | 1/2014 | Chen | A24F 47/008 |
| | | | 128/200.14 |
| 2014/0048086 A1* | 2/2014 | Zhanghua | A24F 47/008 |
| | | | 131/329 |
| 2014/0053858 A1* | 2/2014 | Liu | A24F 15/18 |
| | | | 131/329 |
| 2014/0122889 A1* | 5/2014 | Freund | G01S 19/14 |
| | | | 713/176 |
| 2014/0190502 A1* | 7/2014 | Liu | A24F 47/008 |
| | | | 131/329 |
| 2014/0196731 A1* | 7/2014 | Scatterday | A45C 13/005 |
| | | | 131/329 |
| 2014/0270729 A1* | 9/2014 | DePiano | A24F 47/008 |
| | | | 392/397 |
| 2014/0290677 A1* | 10/2014 | Liu | A61M 15/06 |
| | | | 131/329 |
| 2014/0311503 A1* | 10/2014 | Liu | G02B 27/18 |
| | | | 131/329 |
| 2014/0360514 A1* | 12/2014 | Zhu | A24F 47/008 |
| | | | 131/329 |
| 2015/0034104 A1* | 2/2015 | Zhou | A24F 47/008 |
| | | | 131/329 |
| 2015/0097513 A1* | 4/2015 | Liberti | A24F 47/008 |
| | | | 320/103 |
| 2015/0101625 A1* | 4/2015 | Newton | H05B 1/0244 |
| | | | 131/329 |
| 2015/0116978 A1* | 4/2015 | Kim | H01H 13/88 |
| | | | 362/23.05 |
| 2015/0128970 A1* | 5/2015 | Liu | A24F 47/008 |
| | | | 131/329 |
| 2015/0181937 A1* | 7/2015 | Dubief | A24F 47/008 |
| | | | 131/329 |
| 2015/0181940 A1* | 7/2015 | Liu | A24D 3/043 |
| | | | 131/329 |
| 2015/0189919 A1* | 7/2015 | Liu | A24F 47/008 |
| | | | 131/329 |
| 2015/0231680 A1* | 8/2015 | Jones | B21D 5/008 |
| | | | 72/18.2 |
| 2016/0183593 A1* | 6/2016 | Liu | A24F 47/008 |
| | | | 392/386 |
| 2016/0278431 A1* | 9/2016 | Liu | G06K 9/325 |

* cited by examiner

ELECTRONIC CIGARETTE AND METHOD FOR IDENTIFYING WHETHER THERE IS A MATCH BETWEEN A BATTERY COMPONENT AND AN ATOMIZER COMPONENT THEREIN

CROSS-REFERENCE TO RELATED APPLICATIONS

This application is a continuation application of International Patent Application No. PCT/CN2013/085377, by Zhiyong Xiang, filed Oct. 17, 2013, which are hereby incorporated herein in their entireties by reference.

FIELD OF THE INVENTION

The present application relates to the field of electronic products and their accessories, and more particularly, relates to an electronic cigarette and a method for identifying whether there is a match between a battery component and an atomizer component therein.

BACKGROUND OF THE INVENTION

At present, an electronic cigarette in the market generally comprises a battery assembly and an atomizer assembly connected to the battery assembly. When the electronic cigarette is working, the battery assembly supplies power for the atomizer assembly, in order to heat the tobacco liquid to imitate a smoking effect. However, in an electronic cigarette, the battery assembly and the atomizer assembly are usually made by different manufacturers. Even if the battery assembly and the atomizer assembly are able to be electrically communicated to each other and the electronic cigarette is able to operate, the performances on coordination may be different due to different types and different manufacturing techniques. If the battery assembly is much different from the atomizer assembly, the coordination between the battery assembly and the atomizer assembly will be bad. Thus, the efficiency of the electronic cigarette is low, and there is a security risk.

SUMMARY OF THE INVENTION

The object of the present application is to provide an electronic cigarette and a method for identifying whether there is a match between a battery assembly and an atomizer assembly therein, which can effectively identify the match relation between a battery assembly and an atomizer assembly, aiming at the drawbacks that the electronic cigarette in the prior art may have a low efficiency and a security risk due to the mismatch between the battery assembly and the atomizer assembly therein.

The technical schemes to solve the above technical problems are as follows.

In one aspect, an electronic cigarette is provided, which comprises a battery assembly and an atomizer assembly jointed with the battery assembly. The electronic cigarette further comprises a laser identifying assembly, the laser identifying assembly includes an information portion, a laser transceiver and a controlling module, the information portion includes a group of grooves and bulges which represent a product information, the information portion is defined on a surface of one of the battery assembly and the atomizer assembly, the laser transceiver is mounted at a corresponding position on a side of the other of the battery assembly and the atomizer assembly which faces the information portion; when the atomizer assembly is jointed with the battery assembly, the laser transceiver aims at the information portion, and the information portion reflects an original laser beam sent out by the laser transceiver back to the laser transceiver, then the controlling module determines whether the atomizer assembly is matched with the battery assembly according to the reflected laser beam received by the laser transceiver.

In one embodiment, the information portion includes a metal reflective layer, and the metal reflective layer is provided with a group of grooves and bulges which represent the product information.

In this embodiment, the battery assembly is rotatably connected to the atomizer assembly; the laser transceiver is mounted on an end face of the battery assembly which is adjacent to the atomizer assembly, and the information portion is defined on an end face of the atomizer assembly which is adjacent to the battery assembly; the group of grooves and bulges are substantially arranged in a circular arc shape; when the atomizer assembly is rotated with respect to the battery assembly, the group of grooves and bulges reflect the original laser beam sent out by the laser transceiver back to the laser transceiver successively.

In this embodiment, the atomizer assembly is inserted in the battery assembly; an insertion detecting device for detecting whether the atomizer assembly is inserted into the battery assembly is mounted on the battery assembly, and the controlling module is configured to control to turn on the laser transceiver when the insertion detecting device has detected that the atomizer assembly is inserted into the battery assembly.

In another embodiment, the battery assembly is rotatably connected to the atomizer assembly; the laser transceiver is mounted on an end face of the atomizer assembly which is adjacent to the battery assembly, and the information portion is defined on an end face of the battery assembly which is adjacent to the atomizer assembly; the group of grooves and bulges are substantially arranged in a circular arc shape; when the atomizer assembly is rotated with respect to the battery assembly, the group of grooves and bulges reflect the original laser beam sent out by the laser transceiver back to the laser transceiver successively.

In this embodiment, the atomizer assembly is inserted in the battery assembly; an elastic electric switch for controlling the on-or-off of the laser transceiver is mounted on the atomizer assembly; when the atomizer assembly is inserted into the battery assembly, the elastic electric switch is pressed and deformed to turn on the laser transceiver.

In another embodiment, the atomizer assembly is inserted in the battery assembly; the laser transceiver is mounted on an inner side wall of one end of the battery assembly which is adjacent to the atomizer assembly, and the information portion is defined on an outer side wall of the atomizer assembly which is adjacent to the battery assembly.

In this embodiment, the battery assembly is rotatably connected to the atomizer assembly, and the group of grooves and bulges are substantially arranged in a circular arc shape; when the atomizer assembly is rotated with respect to the battery assembly, the laser transceiver aims at and sends out an original laser beam to each groove and bulge in the circular arc shape successively, the group of grooves and bulges reflect the original laser beam sent out by the laser transceiver back to the laser transceiver successively.

In another embodiment, the atomizer assembly is buckled in the battery assembly, and the group of grooves and bulges are substantially arranged in a straight line shape that is parallel to a central axis of the battery assembly; when the atomizer assembly is axially inserted into the battery assembly, the group of grooves and bulges reflect the original laser beam sent out by the laser transceiver back to the laser transceiver successively.

In another embodiment, the surface of the information portion is a curved surface or a flat surface.

In this embodiment, the electronic cigarette further comprises an alarm that is electrically connected to the controlling module; when the controlling module determines that the atomizer assembly is mismatched with the battery assembly, the controlling module will control the alarm to generate an alarming sound.

In another embodiment, the electronic cigarette further comprises a display screen that is electrically connected to the controlling module, and the controlling module is configured to display the result whether the atomizer assembly is matched with the battery assembly on the display screen.

In another embodiment, the atomizer assembly includes a heating wire electrically connected to the controlling module; the controlling module includes a microprocessor and a power source manage module; when the microprocessor determines that the battery assembly is matched with the atomizer assembly, the microprocessor controls power to the heating wire via the power source manage module to make the heating wire to heat and atomize the tobacco liquid.

In this embodiment, the controlling module further includes a decode module, and the decode module is configured to decode an electric signal transformed by the laser transceiver from the reflected laser beam and deliver a decoded data to the microprocessor.

In a further embodiment, the information portion further includes a polymer sarking layer covered on the metal reflective layer.

In the embodiment, the product information comprises product type, in-and-out voltage, power, smoking frequency, name of supplier or manufacturer, and/or secret key.

In another aspect, a method for controlling the match between a battery assembly and an atomizer assembly in an electronic cigarette is provided, which comprises:

when the battery assembly is jointed with the atomizer assembly, aiming at and sending out an original laser beam on a group of grooves and bulges on the battery assembly or on the atomizer assembly which represent product information;

receiving a reflected laser beam reflected by the group of grooves and bulges;

analyzing the reflected laser beam to obtain the product information and determining whether the battery assembly is matched with the atomizer assembly according to the product information.

In one embodiment, it further comprises:

if the battery assembly is matched with the atomizer assembly, controlling the battery assembly to supply power for the atomizer assembly.

In this embodiment, it further comprises:

if the battery assembly isn't matched with the atomizer assembly, generating an alarming sound.

In another embodiment, it further comprises:

displaying the result whether the battery assembly is matched with the atomizer assembly.

The following beneficial effects will be achieved when implementing the present application. An information portion that comprises a group of grooves and bulges representative of product information is defined on a surface of one of a battery assembly and an atomizer assembly, and a laser transceiver is mounted at a corresponding position on a side of the other of the battery assembly and the atomizer assembly which faces the information portion. When the atomizer assembly is jointed with the battery assembly, the laser transceiver aims at the information portion, and the information portion reflects an original laser beam sent out by the transceiver back to the laser transceiver. Then a controlling module determines whether the atomizer assembly is matched with the battery assembly according to the reflected laser beam received by the transceiver. Therefore, the match relation between the atomizer assembly and the battery assembly can be effectively identified, and the drawbacks that the electronic cigarette may have a low efficiency and a security risk due to the mismatch between the atomizer assembly and the battery assembly can be overcame.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

To make the objects, technical schemes and advantages more clearly, the present application may be further described in detail with reference to the accompanying drawings and embodiments.

Electronic cigarette in the market comprises integrally formed electronic cigarettes and detachable electronic cigarettes. In a detachable electronic cigarette, the battery assembly and the atomizer assembly are dismountable and connected. As a result, when a user assembles a battery assembly with an atomizer assembly, the performance of the electronic cigarette may be poor and a security risk exists, due to the differences in types, manufacturing techniques or manufacturers. The present application provides an electronic cigarette with a laser identifying assembly, which can effectively recognize whether the battery assembly and the atomizer assembly are matched.

Figure 1:
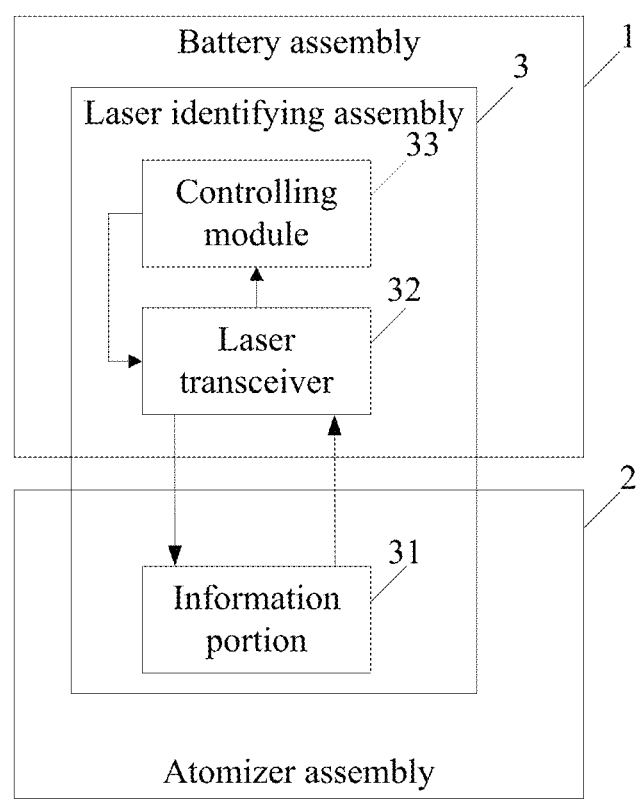
FIG. 1 is a diagram of an electronic cigarette of a first embodiment of the present application.
Figure 2:
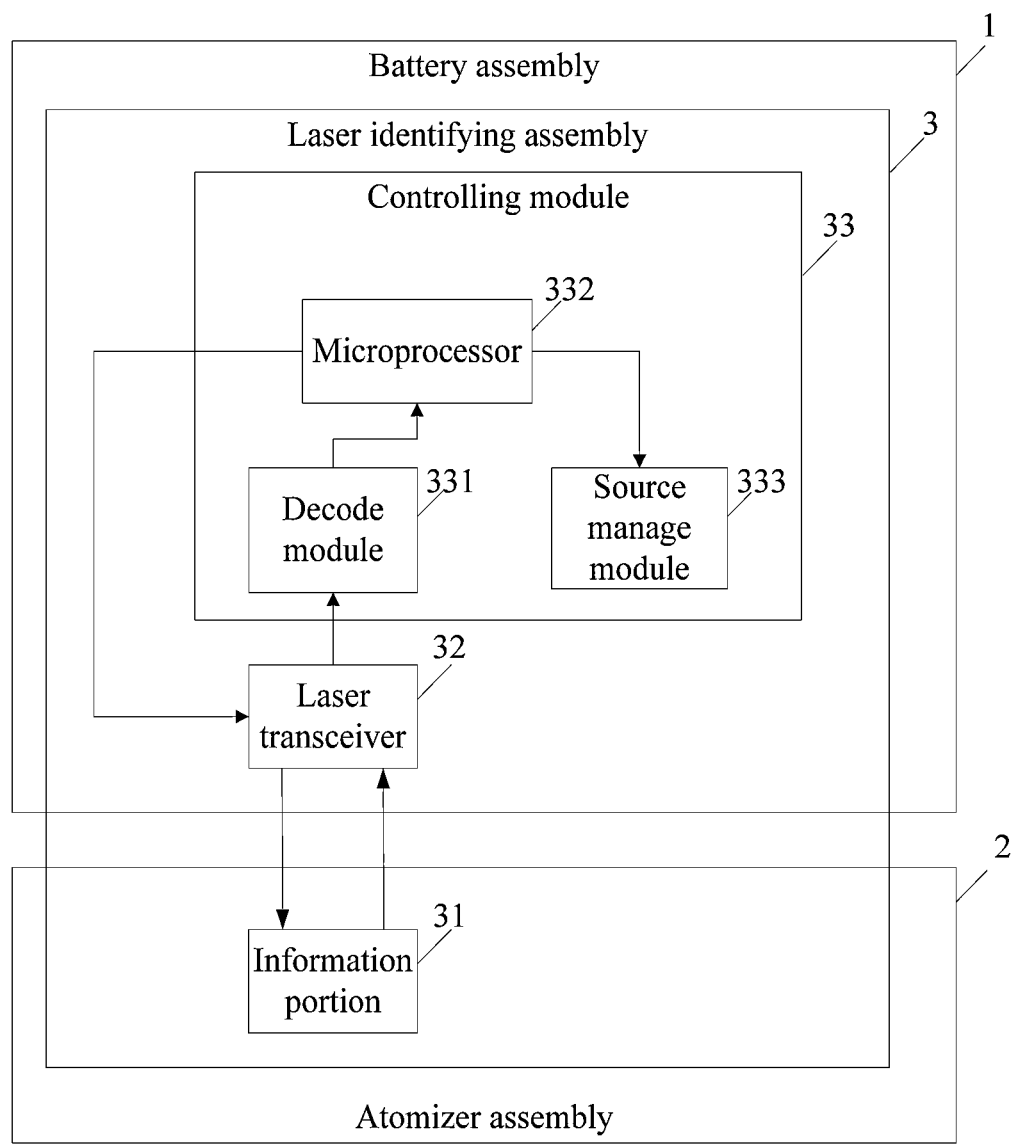
FIG. 2 is a diagram of an electronic cigarette of a second embodiment of the present application.

FIG. 1 is a diagram of an electronic cigarette of a first embodiment of the present application. FIG. 2 is a diagram of an electronic cigarette of a second embodiment of the present application. Referring to FIG. 1, an electronic cigarette comprises a battery assembly 1, an atomizer assembly 2 and a laser identifying assembly 3. Wherein, the laser identifying assembly 3 includes an information portion 31, a laser transceiver 32 and a controlling module 33. The information portion 31 includes a group of grooves and bulges which represent the product information. The surface of the information portion 31 is a curved surface or a flat surface. Specifically, the information portion 31 may include a metal reflective layer (such as an aluminum reflective layer), and the metal reflective layer is provided with a group of grooves and bulges which represent the product information. Preferably, in order to avoid scratching the metal reflective layer, which may lead to losing the information, a polymer (such as polycarbonate) sarking layer can be covered on the metal reflective layer. In the case, the laser can pass through the polymer sarking layer.

The laser transceiver 32 mainly includes a laser transmitter (namely a laser diode), a semi reflective prism, an object glass, a lens, and a photodiode. When the laser transceiver 32 reads data from the information portion 31, a laser beam emitted from the laser transmitter passes through the semi reflective prism and gathers on the object glass. Then the object glass focuses the laser beam into a tiny light spot and sends the light spot to the information portion 31. In this moment, the reflective material on the information portion 31 reflects the light back, and then the reflected light passes through the object glass and arrives at the semi reflecting prism. In this case, since the prism has a semi reflective structure, the light can't wholly pass through the prism to return to the laser transmitter, but is reflected by the semi reflective prism and passes through the lens to arrive at the photodiode. The values of reflectivity of the reflected lights will be different according to different bulges and grooves on the surface of the information portion 31. Each bulge or groove represents a data. Generally, a region of high reflectivity represents a binary code 1, and a region of low reflectivity represents a binary code 0. The photodiode receives a laser beam signal consisting of the "0" and "1", then transforms the laser beam signal to an electric signal, and finally sends the electric signal to the controlling module 33 to be analyzed to an identification information demanded.

In one embodiment shown in FIG. 1 and FIG. 2, the information portion 31 is positioned on the atomizer assembly 2, and the laser transceiver 32 and the controlling module 33 are positioned on the battery assembly 1. When the battery assembly 1 joints with the atomizer assembly 2 or the battery assembly 1 comes into the vicinity of the atomizer assembly 2, the laser transceiver 32 on the battery assembly 1 sends out an original laser beam. When the original laser beam is aimed at the information portion 31 on the atomizer assembly 2, the information portion 31 reflects the original laser beam back to the laser transceiver 32. Then the controlling module 33 identifies whether the atomizer assembly 2 is matched with the battery assembly 1 according to the reflected laser beam received by the laser transceiver 32. In this case, the drawback that the efficiency of the electronic cigarette is low due to the mismatch between the atomizer assembly 2 and the battery assembly 1 can be overcome. Besides, the security risk due to the mismatch between the atomizer assembly 2 and the battery assembly 1 can be avoided. It should be understood by the skilled in the art that, in other embodiments of the present application, the information portion 31 can be positioned on the battery assembly 1, and the laser transceiver 32 can be positioned on the atomizer assembly 2, as long as at least part of the information portion 31 can face the laser transceiver 32 when the battery assembly 1 joints with the atomizer assembly 2. In one example, the laser transceiver 32 is positioned on one end face of the battery assembly 1 which is adjacent to the atomizer assembly 2, and the information portion 31 is positioned on one end face of the atomizer assembly which is adjacent to the battery assembly 1. In another example, the laser transceiver 32 is positioned on one end face of the atomizer assembly 2 which is adjacent to the battery assembly 1, and the information portion 31 is positioned on one end face of the battery assembly 1 which is adjacent to the atomizer assembly 2. However, since the battery assembly 1 can supply power for the laser transceiver 32 while the atomizer assembly 2 cannot supply power for the laser transceiver 32, the laser transceiver 32 must be provided with a power source if the laser transceiver 32 is positioned on the atomizer assembly 2. In order to simplify the structure, the laser transceiver 32 is preferred to be positioned on the battery assembly 1. Likewise, the controlling module 33 is always integrated in the battery assembly 1. Specifically, since the battery assembly 1 has its own processor, the controlling module 33 can be directly integrated in the processor inherent in the battery assembly 1. Of course, the controlling module 33 also can be an independent processor electrically connected to the battery assembly 1.

Specifically, referring to FIG. 2, the controlling module 33 can include a decode module 331, a microprocessor 332 and a power source manage module 333.

The decode module 331 is configured to receive the electric signal transformed from the reflected laser beam by the laser transceiver 32, namely the photodiode of the laser transceiver 32 transforms the reflected laser beam that consists of the "0" and "1" to the electric signal. And the decode module 331 is also configured to decode the electric signal to generate a product information, such as product type, in-and-out voltage, power, smoking frequency, name of the supplier or manufacturer, logo, secret key and so on. Then the decode module 331 delivers the decoded product information to the microprocessor 332. It should be noted that the decode module 331 can be realized by hardware and/or software, which belongs to common technical schemes and doesn't need to be described in detail here.

The microprocessor 332 is configured to compare the received product information with the product information stored locally and determine whether the atomizer assembly 2 is matched with the battery assembly 1. Specifically, each groove in the information portion 31 represents "0" and each bulge in the information portion 31 represents "1", and an arrangement of several "0"s and "1"s represents a product information. Besides, the microprocessor 332 is also configured to send the result of the determining operation to the power source manage module 333. The microprocessor 332 can be realized by hardware and/or software, which belong to common technical schemes and doesn't need to be described in detail here.

The power source manage module 333 is configured to connect a battery in the battery assembly 1 to the atomizer assembly 2 through circuits under the control of the microprocessor 332 when the battery assembly 1 is matched with the atomizer assembly 2, so that the battery assembly 1 can supply power for the atomizer assembly 2 to make a heating wire in the atomizer assembly 2 to heat and atomize the tobacco liquid. In this way, the electronic cigarette can be automatically triggered to operate when the atomizer assembly 2 is determined to be matched with the battery assembly 1. The power source manage module 333 can be realized by hardware and/or software, which belongs to common technical schemes and doesn't need to be described in detail here.

In a preferred embodiment, the electronic cigarette further comprises an alarm that is electrically connected to the microprocessor 332. When the microprocessor 332 determines that the atomizer assembly 2 is mismatched with the battery assembly 1, the microprocessor 332 will control the alarm to generate an alarming sound. In this manner, when the atomizer assembly 2 is determined to be mismatched with the battery assembly 1, the user can be indicated to disconnect the atomizer assembly 2 from the battery assembly 1.

In another preferred embodiment, the electronic cigarette further comprises a display screen that is electrically connected to the microprocessor 332. The microprocessor 332 can display the result of the determining operation (namely the result whether the atomizer assembly 2 is matched with the battery assembly 1) on the display screen. In this manner, the result of the determining operation can be informed to the user in time, so that the user can carry out other corresponding operations.

Referring to FIGS. 3A-3C and 4A-4B, the battery assembly 1 of the electronic cigarette in the market usually comprises a battery rod sleeve 11, namely the atomizer assembly 2 is usually inserted in the battery rod sleeve 11 of the battery assembly 1. In the following, electronic cigarettes in which the atomizer assemblies 2 are inserted in the battery assemblies 1 are given as examples to describe the structure and the operating process of the laser identifying assembly in detail. The skilled in the art can easily conclude the structure when the battery assembly 1 is inserted in the atomizer assembly 2 according to the following description.

Figure 3A:
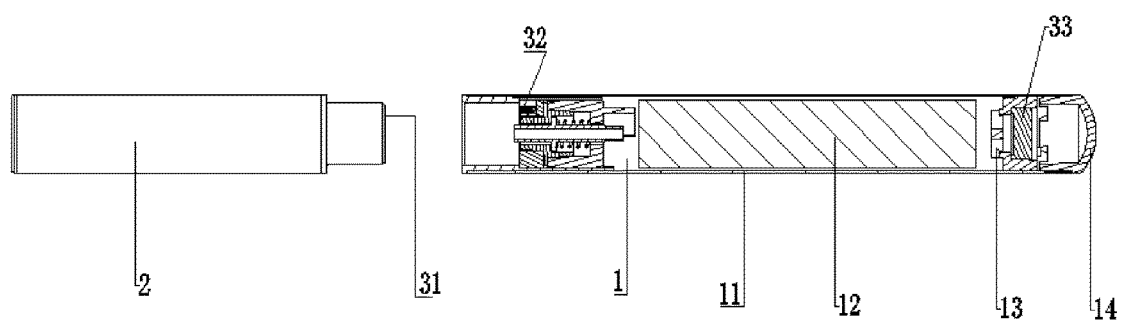
FIG. 3A is a disassembled structural diagram of an exemplary electronic cigarette shown in FIG. 1 or FIG. 2.
Figure 3B:
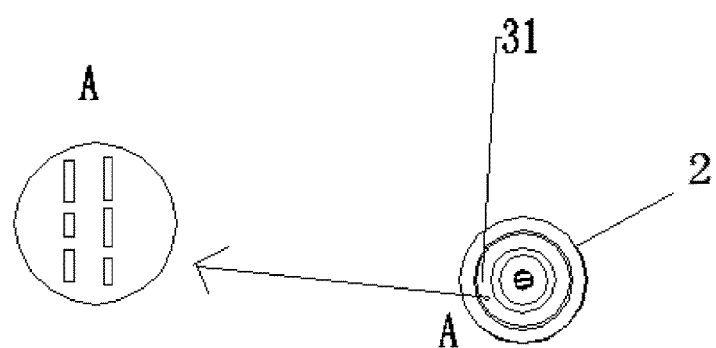
FIG. 3B is a diagram of an end face of the atomizer assembly in the electronic cigarette which faces the battery assembly shown in FIG. 3A.
Figure 3C:
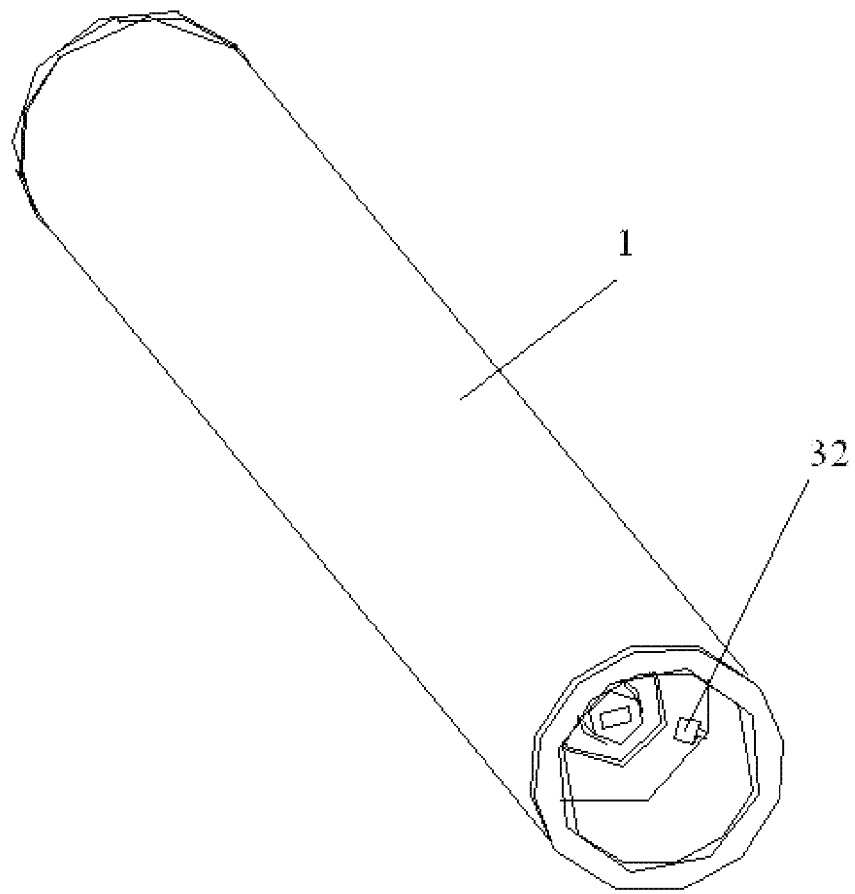
FIG. 3C is a three-dimensional structural diagram of the battery assembly in the electronic cigarette shown in FIG. 3A.

A first embodiment refers to FIGS. 3A-3C. FIG. 3A is a disassembled structural diagram of an exemplary electronic cigarette shown in FIG. 1 or FIG. 2. FIG. 3B is a diagram of an end face of the atomizer assembly in the electronic cigarette which faces the battery assembly shown in FIG. 3A. FIG. 3C is a three-dimensional structural diagram of the battery assembly in the electronic cigarette shown in FIG. 3A. The battery assembly 1 is rotatably connected with the atomizer assembly 2. The laser transceiver 32 is mounted on an end face of the battery assembly 1 which is adjacent to the atomizer assembly 2, and the information portion 31 is defined on an end face of the atomizer assembly 2 which is adjacent to the battery assembly 1. Referring to FIG. 3B, the point A is located in the information portion 31, and in the amplified view of the point A, a block represents a groove or a bulge. Preferably, a group of grooves and bulges are substantially arranged in a circular arc shape. When the atomizer assembly 2 is inserted into the battery assembly 1 and is rotated with respect to the battery assembly 1, the laser transceiver 32 aims at and sends out an original laser beam to each groove and bulge in the circular arc shape successively, and theses grooves and bulges reflect the original laser beams back to the laser transceiver 32 successively. Then the controlling module 33 determines whether the atomizer assembly 2 is matched with the battery assembly 1 according to the reflected laser beams received by the laser transceiver 32. However, in the application, since the amount of information that should be identified in the information portion 31 is small, generally only three or four grooves and bulges are used to form the group to identify the information in order to simplify the manufacturing process. As a result, these grooves and bulges also can be arranged in a straight line shape shown in the amplified view of the point A.

In this embodiment, an insertion detecting device for detecting whether the atomizer assembly 2 is inserted into the battery assembly 1 is mounted on the battery assembly 1. The controlling module 33 controls to turn on the laser transceiver 32 if the insertion detecting device has detected that the atomizer assembly 2 is inserted into the battery assembly 1, and then the laser transceiver 32 starts to sends out original laser beams. For example, the insertion detecting device may be a hall sensor mounted on an opening end of the battery assembly 1, and the atomizer assembly 2 includes conductive material. When the atomizer assembly 2 passes through the magnetic field of the hall sensor, a change in the output voltage of the hall sensor can be detected. It should be understood that the insertion detecting device also can be any other device that is able to detect the insertion of the atomizer assembly 2, such as a spring button. The technique belongs to common technical schemes in the art and does not need to be described in detail here.

Similarly, in a second embodiment, the battery assembly 1 is rotatably connected to the atomizer assembly 2. The laser transceiver 32 is mounted on an end face of the atomizer assembly 2 which is adjacent to the battery assembly 1, and the information portion 31 is defined on an end face of the battery assembly 1 which is adjacent to the atomizer assembly 2. A group of grooves and bulges are substantially arranged in a circular arc shape. When the atomizer assembly 2 is inserted into the battery assembly 1 and is rotated with respect to the battery assembly 1, the laser transceiver 32 aims at and sends out an original laser beam to each groove and bulge in the circular arc shape successively, and theses grooves and bulges reflect the original laser beams back to the laser transceiver 32 successively. Then the controlling module 33 determines whether the atomizer assembly 2 is matched with the battery assembly 1 according to the reflected laser beams received by the laser transceiver 32.

In this embodiment, an elastic electric switch for controlling the on-or-off of the laser transceiver 32 is mounted on the atomizer assembly 2. When the atomizer assembly 2 is inserted into the battery assembly 1, the elastic electric switch is pressed and deformed. Then the laser transceiver 32 is controlled to be turned on and starts to send out original laser beams. For example, the elastic electric switch can be a spring button mounted on a side wall of one end of the atomizer assembly 2 which is adjacent to the battery assembly 1. The technique belongs to common technical schemes in the art and does not need to be described in detail here.

Figure 4A:
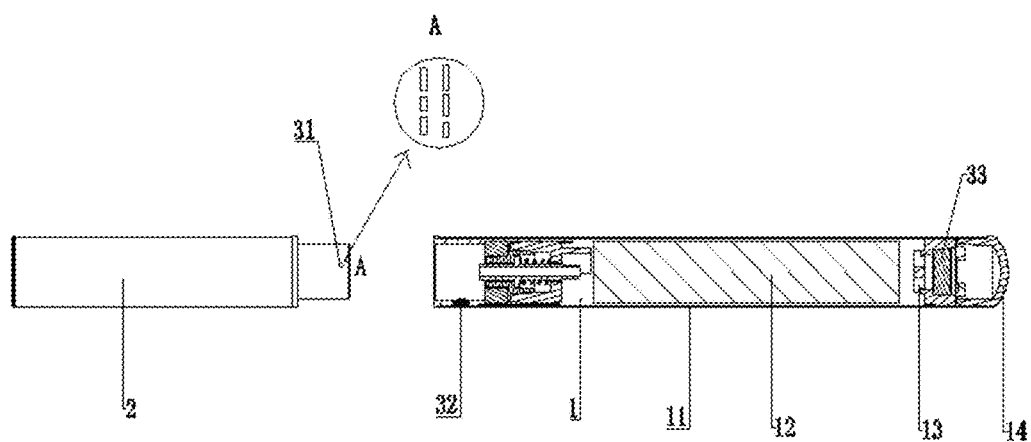
FIG. 4A is a disassembled structural diagram of another exemplary electronic cigarette shown in FIG. 1 or FIG. 2.
Figure 4B:
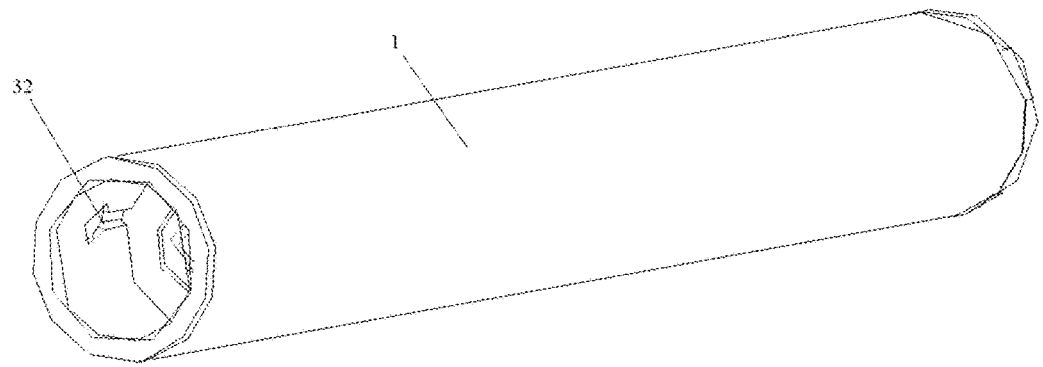
FIG. 4B is a three-dimensional structural diagram of the battery assembly in the electronic cigarette shown in FIG. 4A.

A third embodiment refers to FIGS. 4A-4B. FIG. 4A is a disassembled structural diagram of another exemplary electronic cigarette shown in FIG. 1 or FIG. 2. FIG. 4B is a three-dimensional structural diagram of the battery assembly in the electronic cigarette shown in FIG. 4A. The atomizer assembly 2 is rotatably inserted in the battery assembly 1. The laser transceiver 32 is mounted on an inner side wall of one end of the battery assembly 1 which is adjacent to the atomizer assembly 2, and the information portion 31 is defined on an outer side wall of the atomizer assembly 2 which is adjacent to the battery assembly 1. In FIG. 4A, the point A is located in the information portion 31, and in the amplified view of the point A, a block represents a groove or a bulge. Preferably, the group of grooves and bulges are substantially arranged in a circular arc shape. When the atomizer assembly 2 is inserted into the battery assembly 1 and is rotated with respect to the battery assembly 1, the laser transceiver 32 aims at and sends out an original laser beam to each groove and bulge in the circular arc shape successively, and theses grooves and bulges reflect the original laser beams back to the laser transceiver 32 successively. Then the controlling module 33 determines whether the atomizer assembly 2 is matched with the battery assembly 1 according to the reflected laser beams received by the laser transceiver 32.

A fourth embodiment also refers to FIGS. 4A-4B. The atomizer assembly 2 is buckled in the battery assembly 1. The laser transceiver 32 is mounted on an inner side wall of one end of the battery assembly 1 which is adjacent to the atomizer assembly 2, and the information portion 31 is defined on an outer side wall of the atomizer assembly 2 which is adjacent to the battery assembly 1. Referring to FIG. 4A, the point A is located in the information portion 31, and in the amplified view of the point A, a block represents a groove or a bulge. Preferably, the group of grooves and bulges are substantially arranged in a straight line shape that is parallel to a central axis of the battery assembly 1. When the atomizer assembly 2 is axially inserted into the battery assembly 1, the laser transceiver 32 aims at and sends out an original laser beam to each groove and bulge in the straight line shape successively, and theses grooves and bulges reflect the original laser beams back to the laser transceiver 32 successively. Then the controlling module 33 determines whether the atomizer assembly 2 is matched with the battery assembly 1 according to the reflected laser beams received by the laser transceiver 32.

In the third and fourth embodiments, an insertion detecting device similar to the first embodiment can be mounted on the battery assembly 1 too.

In above embodiments, through providing an insertion detecting device or an elastic electric switch, the laser transceiver can be automatically turned on when the battery assembly 1 is jointed with the atomizer assembly 2, and then the laser transceiver starts to send out original laser beams to facilitate the user. In other embodiments of the present application, a transceiver switch button that is electrically connected to the laser transceiver can also be mounted on the shell of the electronic cigarette, in order to facilitate the user to control the on-or-off of the laser transceiver manually. The technique belongs to common technical schemes in the art and does not need to be described in detail here.

Referring to FIGS. 3A-3C and 4A-4B, the battery assembly 1 further comprises a battery 12, a microphone holder 13 and a lamp cap 14. The battery 12 is sheathed in the battery rod sleeve 11. The microphone holder 13 and the lamp cap 14 are mounted on an end of the battery rod sleeve 11 which is away from the atomizer assembly 2. The controlling module 33 is accommodated in the microphone holder 13. In this manner, the controlling module 22 is arranged near to the battery 12 to obtain power from the battery 12 and the routing is simplified. Besides, since the controlling module 33 is isolated in the microphone holder 13, it is hard to damage the controlling module 33 and so the service life of the controlling module 33 can be lengthened.

Figure 5:
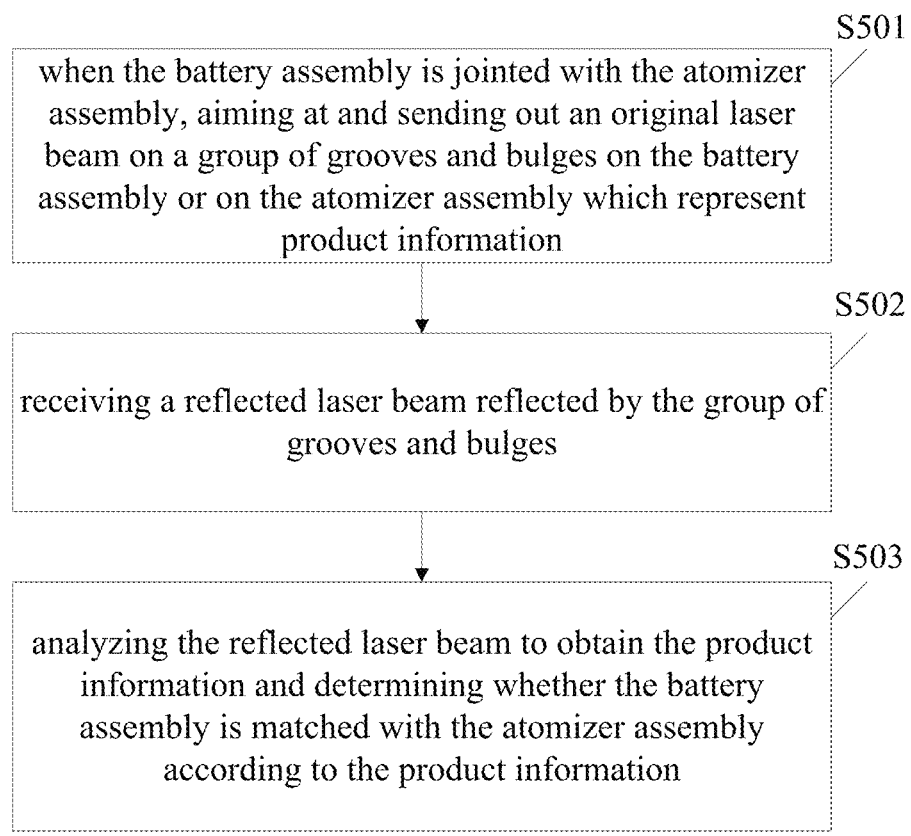
FIG. 5 is a flow chart of a method for identifying whether there is a match between a battery assembly and an atomizer assembly in an electronic cigarette of a first embodiment of the present application.

Referring to FIG. 5, a flow chart of a method for identifying whether there is a match between a battery assembly 1 and an atomizer assembly 2 in an electronic cigarette of a first embodiment of the present application is provided. The method comprises:

S501: when the battery assembly 1 is jointed with the atomizer assembly 2, aiming at and sending out an original laser beam on a group of grooves and bulges on the battery assembly 1 or on the atomizer assembly 2 which represent product information.

S502: receiving the laser beam reflected by the group of grooves and bulges.

S503: analyzing the reflected laser beam to obtain the product information and determining whether the battery assembly 1 is matched with the atomizer assembly 2 according to the product information.

In the method for controlling the match between the battery assembly 1 and the atomizer assembly 2 in the electronic cigarette provided in the embodiment of the present application, through aiming at and sending out an original laser beam on a group of grooves and bulges on the battery assembly 1 or on the atomizer assembly 2 which represent product information when the atomizer assembly 2 is jointed with the battery assembly 1, and determining whether the battery assembly 1 is matched with the atomizer assembly 2 according to the reflected laser beam reflected by the group of grooves and bulges, the match relation between the atomizer assembly 2 and the battery assembly 1 can be effectively identified. Therefore, the drawback that the efficiency of the electronic cigarette is low due to the mismatch between the atomizer assembly 2 and the battery assembly 1 can be overcame, and the security risk due to the mismatch between the atomizer assembly 2 and the battery assembly 1 can be avoided.

Figure 6:
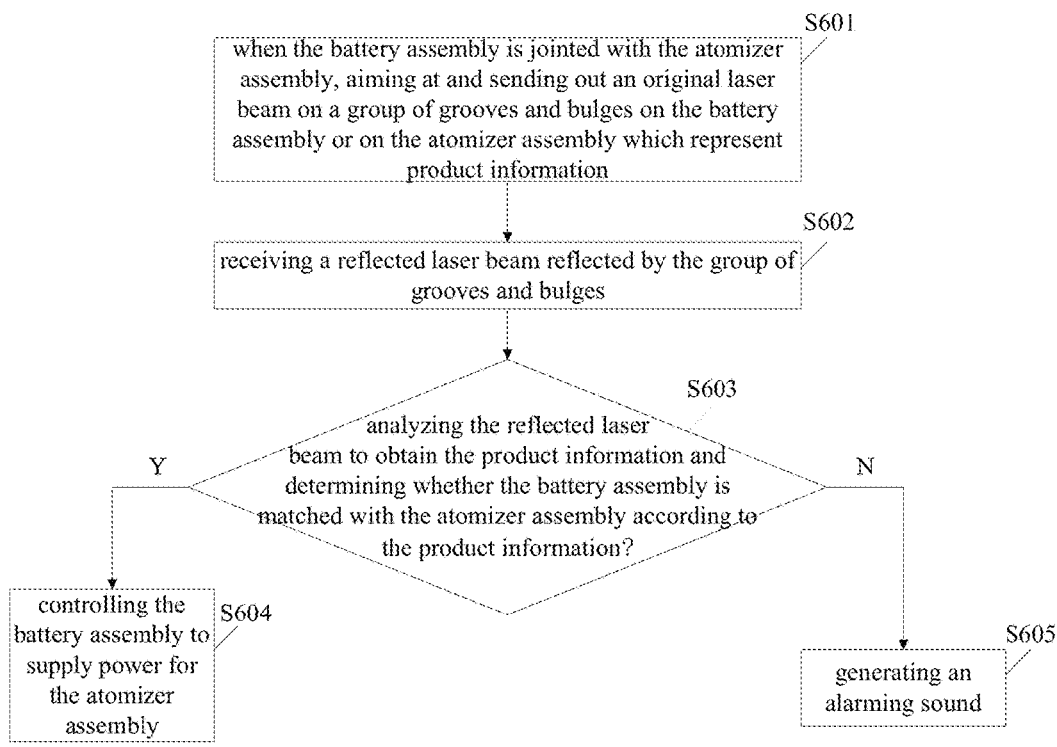
FIG. 6 is a flow chart of a method for identifying whether there is a match between a battery assembly and an atomizer assembly in an electronic cigarette of a second embodiment of the present application.

Referring to FIG. 6, a flow chart of a method for identifying whether there is a match between a battery assembly 1 and an atomizer assembly 2 in an electronic cigarette of a second embodiment of the present application is provided. The method comprises:

S601: when the battery assembly 1 is jointed with the atomizer assembly 2, aiming at and sending out an original laser beam on a group of grooves and bulges on the battery assembly 1 or on the atomizer assembly 2 which represent product information.

S602: receiving the laser beam reflected by the group of grooves and bulges.

S603: analyzing the reflected laser beam to obtain the product information and determining whether the battery assembly 1 is matched with the atomizer assembly 2 according to the product information.

If the battery assembly 1 is matched with the atomizer assembly 2, proceeds to step S604. S604: controlling the battery assembly 1 to supply power for the atomizer assembly 2.

If the battery assembly 1 isn't matched with the atomizer assembly 2, proceeds to step S605. S605: generating an alarming sound.

Besides, in other embodiments of the present application, the method can further comprise: displaying the determining result (namely the result whether the battery assembly 1 is matched with the atomizer assembly 2).

While the embodiments of the present application have been described with reference to the drawings, the present application will not be limited to above embodiments that are illustrative but not limitative. It will be understood by those skilled in the art that various changes and equivalents may be substituted in the light of the present application without departing from the scope of the present application, and those various changes and equivalents shall fall into the protection of the application.

What is claimed is:

1. An electronic cigarette, comprising:
   a battery assembly and an atomizer assembly rotatably connected with the battery assembly; wherein the electronic cigarette further comprises a laser identifying assembly, the laser identifying assembly includes an information portion on the atomizer assembly, a laser transceiver and a controlling module, the information portion includes a metal reflective layer, and the metal reflective layer is provided with a group of grooves and bulges which represent a product information, the group of grooves and bulges are substantially arranged in a circular arc shape;

wherein the laser transceiver is mounted on an end face of the battery assembly which is adjacent to the atomizer assembly, and the information portion is defined on an end face of the atomizer assembly which is adjacent to the battery assembly, and the atomizer assembly is inserted in the battery assembly; an insertion detecting device for detecting whether the atomizer assembly is inserted into the battery assembly is mounted on the battery assembly, and the controlling module is configured to control to turn on the laser transceiver when the insertion detecting device has detected that the atomizer assembly is inserted into the battery assembly;

wherein the atomizer assembly includes a heating wire electrically connected to the controlling module; the controlling module includes a microprocessor and a power source manage module;

when the atomizer assembly is rotated with respect to the battery assembly, the laser transceiver aims at the information portion, and the group of grooves and bulges of the information portion reflects an original laser beam sent out by the laser transceiver back to the laser transceiver successively, then the microprocessor determines whether the atomizer assembly is matched with the battery assembly according to the reflected laser beam received by the laser transceiver and controls power to the heating wire via the power source manage module to make the heating wire to heat and atomize a tobacco liquid.

2. The electronic cigarette according to claim 1, wherein the electronic cigarette further comprises an alarm that is electrically connected to the controlling module; when the controlling module determines that the atomizer assembly is mismatched with the battery assembly, the controlling module will control the alarm to generate an alarming sound.

3. The electronic cigarette according to claim 1, wherein the electronic cigarette further comprises a display screen that is electrically connected to the controlling module, and the controlling module is configured to display the result whether the atomizer assembly is matched with the battery assembly on the display screen.

4. The electronic cigarette according to claim 1, wherein the controlling module further includes a decode module, and the decode module is configured to decode an electric signal transformed by the laser transceiver from the reflected laser beam and deliver a decoded data to the microprocessor.

5. The electronic cigarette according to claim 1, wherein the information portion further includes a polymer sarking layer covered on the metal reflective layer.

6. The electronic cigarette according to claim 1, wherein the product information comprises product type, in-and-out voltage, power, smoking frequency, name of supplier or manufacturer, and/or secret key.

7. An electronic cigarette, comprising:
a battery assembly and an atomizer assembly jointed with the battery assembly; wherein the electronic cigarette further comprises a laser identifying assembly, the laser identifying assembly includes an information portion on the atomizer assembly, a laser transceiver and a controlling module, the information portion includes a metal reflective layer, and the metal reflective layer is provided with a group of grooves and bulges which represent a product information; the laser transceiver is mounted on an inner side wall of one end of the battery assembly which is adjacent to the atomizer assembly, and the information portion is defined on an outer side wall of the atomizer assembly which is adjacent to the battery assembly;

wherein the atomizer assembly includes a heating wire electrically connected to the controlling module; the controlling module includes a microprocessor and a power source manage module;

when the atomizer assembly is jointed with the battery assembly, the laser transceiver aims at the information portion, and the information portion reflects an original laser beam sent out by the laser transceiver back to the laser transceiver, then the microprocessor determines whether the atomizer assembly is matched with the battery assembly according to the reflected laser beam received by the laser transceiver and controls power to the heating wire via the power source manage module to make the heating wire to heat and atomize a tobacco liquid.

8. The electronic cigarette according to claim 7, wherein, the battery assembly is rotatably connected to the atomizer assembly, and the group of grooves and bulges are substantially arranged in a circular arc shape; when the atomizer assembly is rotated with respect to the battery assembly, the laser transceiver aims at and sends out an original laser beam to each groove and bulge in the circular arc shape successively, the group of grooves and bulges reflect the original laser beam sent out by the laser transceiver back to the laser transceiver successively.

9. The electronic cigarette according to claim 7, wherein the atomizer assembly is buckled in the battery assembly, and the group of grooves and bulges are substantially arranged in a straight line shape that is parallel to a central axis of the battery assembly; when the atomizer assembly is axially inserted into the battery assembly, the group of grooves and bulges reflect the original laser beam sent out by the laser transceiver back to the laser transceiver successively.

10. The electronic cigarette according to claim 7, wherein the controlling module further includes a decode module, and the decode module is configured to decode an electric signal transformed by the laser transceiver from the reflected laser beam and deliver a decoded data to the microprocessor;
wherein the information portion further includes a polymer sarking layer covered on the metal reflective layer; and
wherein the product information comprises product type, in-and-out voltage, power, smoking frequency, name of supplier or manufacturer, and/or secret key.

* * * * *